United States Patent
Barrett et al.

(10) Patent No.: US 7,097,004 B2
(45) Date of Patent: Aug. 29, 2006

(54) PRESSURE BLEEDING BOOT-TYPE SEAL

(75) Inventors: Sean Barrett, Farmington Hills, MI (US); Seiji Nishimura, West Bloomfield, MI (US); Takashi Matsumoto, Commerce Township, MI (US)

(73) Assignee: Akebono Corporation (North America), Farmington Hills, MI (US)

( * ) Notice: Subject to any disclaimer, the term of this patent is extended or adjusted under 35 U.S.C. 154(b) by 0 days.

(21) Appl. No.: 10/350,605

(22) Filed: Jan. 24, 2003

(65) Prior Publication Data

US 2004/0144603 A1 Jul. 29, 2004

(51) Int. Cl.
*F16D 55/18* (2006.01)

(52) U.S. Cl. .............. 188/72.4; 277/634; 277/552; 188/73.1

(58) Field of Classification Search .......... 277/552, 277/634, 635, 636; 188/71.1, 72.1, 72.4, 188/73.1, 370
See application file for complete search history.

(56) References Cited

U.S. PATENT DOCUMENTS

| | | | |
|---|---|---|---|
| 1,437,130 A | 11/1922 | Chandler | |
| 3,403,932 A | 10/1968 | Kutcher | |
| 3,490,343 A * | 1/1970 | Afanador et al. | 92/168 |
| 3,528,301 A * | 9/1970 | Wasmer | 74/18.2 |
| 4,199,159 A * | 4/1980 | Evans | 277/636 |
| 4,294,335 A | 10/1981 | Maehara | |
| 4,304,416 A * | 12/1981 | Oshima | 277/561 |
| 4,469,337 A | 9/1984 | Yokoi et al. | |
| 4,506,768 A * | 3/1985 | Innocent | 188/370 |
| 4,524,677 A * | 6/1985 | Ashman et al. | 92/168 |
| 4,629,641 A | 12/1986 | Paullin | |
| 4,852,891 A * | 8/1989 | Sugiura et al. | 277/636 |
| 5,048,648 A * | 9/1991 | Le Deit | 188/370 |
| 5,244,215 A * | 9/1993 | Cather et al. | 277/309 |
| 5,261,678 A | 11/1993 | Takemori et al. | |
| 5,458,344 A * | 10/1995 | Weiler et al. | 277/634 |
| 5,499,701 A | 3/1996 | Harinaga | |
| 5,524,904 A * | 6/1996 | Willi et al. | 277/552 |
| 5,826,681 A | 10/1998 | Kubo et al. | |
| 5,899,463 A | 5/1999 | Koch | |
| 6,179,717 B1 | 1/2001 | Schwarzler | |
| 6,298,955 B1 * | 10/2001 | Frost | 188/72.9 |
| 6,308,959 B1 * | 10/2001 | Sokolihs et al. | 277/394 |
| 6,354,602 B1 | 3/2002 | Oldenburg | |

FOREIGN PATENT DOCUMENTS

| | | |
|---|---|---|
| DE | 2 304 042 | 8/1974 |
| EP | 0 693 634 A1 | 1/1996 |
| FR | 2 771 148 | 5/1999 |
| FR | 2771148 A1 * | 5/1999 |

* cited by examiner

*Primary Examiner*—Robert A. Siconolfi
(74) *Attorney, Agent, or Firm*—Harness, Dickey & Pierce, P.L.C.

(57) ABSTRACT

A boot-type seal having a seal and a valve. The seal has a first seal member, which is configured to sealingly engage a first surface, and a second seal member, which is configured to sealingly engage a second surface. The valve is coupled to the seal and is operable in a first condition, which inhibits fluid communication therethrough, and a second condition, which permits fluid communication therethrough. The condition of the valve changes from the first condition to the second condition in response to a fluid pressure exerted on a side of the seal that exceeds a predetermined threshold pressure. A brake assembly that incorporates the boot-type seal is also provided.

8 Claims, 5 Drawing Sheets

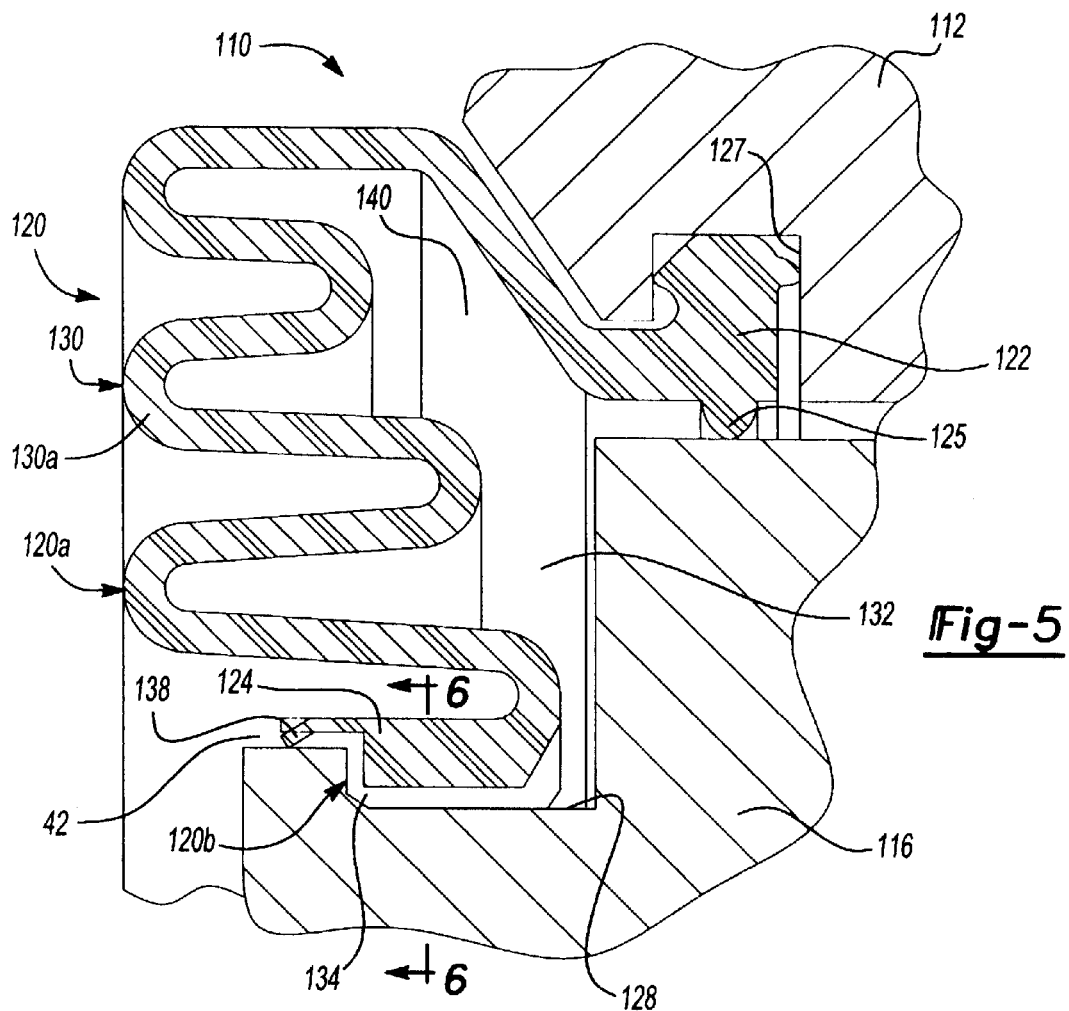
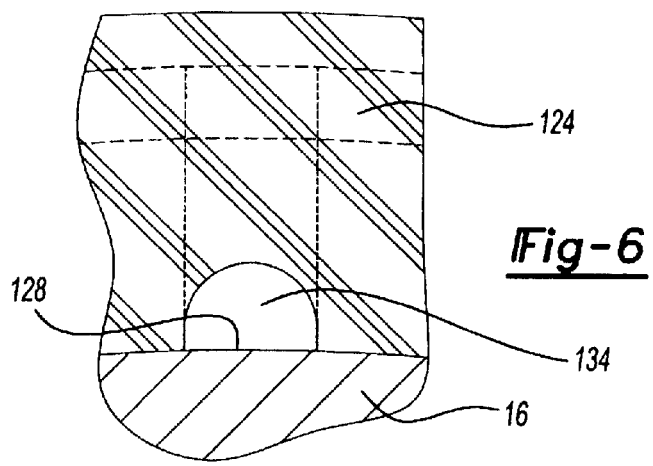

PRESSURE BLEEDING BOOT-TYPE SEAL

FIELD OF THE INVENTION

The present invention generally relates to boot-type seals and more particularly to a pressure-bleeding boot-type seal that is especially suited for use in a brake assembly.

BACKGROUND OF THE INVENTION

A typical brake assembly for a motor vehicle includes a caliper assembly and one or more brake pads. The caliper assembly includes a frame or body, which is mounted to the structure of the vehicle and a caliper piston. The caliper piston is movably mounted to the caliper body so as to be selectively engagable with the brake pads to cause the brake pads to frictionally engage an element, such as a vehicle rotor, to thereby slow or stop the vehicle.

The caliper body includes a piston bore into which the piston is received. A boot-type seal is typically employed to seal around the perimeter of both the piston bore and the caliper piston to inhibit moisture, dirt, debris and other contaminants from entering the piston bore and potentially damaging the caliper body and/or caliper piston. Despite the widespread use of such boot-type seals, several drawbacks are known and thus, such boot-type seals are susceptible to improvement.

One such drawback concerns the buildup of fluid pressure within such boot-type seals. As those of ordinary skill in the art will appreciate, heat generated during the operation of the brake assembly causes the air that is trapped by the boot-type seal to expand. In especially severe instances, it may be possible for the boot-type seal to expand and deleteriously contact another portion of the brake assembly, causing the boot-type seal to burn, melt, or otherwise undergo a shortening of its useful life as a result of thermal cycling at elevated temperatures. If severe enough, such damage may lead to a failure of the boot-type seal through which dirt, debris, moisture and other contaminants may be transmitted.

SUMMARY OF THE INVENTION

In one preferred form, the present invention provides a boot-type seal for sealing a joint between a first surface and a second surface. The boot-type seal includes a seal having a first seal member, which is configured to sealingly engage the first surface, and a second seal member, which is configured to sealingly engage the second surface. The boot-type seal also includes a valve that is coupled to the seal. The valve is operable in a first condition, which inhibits fluid communication therethrough, and a second condition which permits fluid communication therethrough. The condition of the valve changes from the first condition to the second condition in response to a fluid pressure exerted on a side of the seal that exceeds a predetermined threshold pressure.

In another preferred form, the present invention provides a brake assembly having a caliper body, a caliper piston and a boot seal. The caliper piston is at least partially disposed in a piston bore formed in the caliper body. The boot seal cooperates with the caliper body and the piston to define a cavity. The piston boot includes a first seal member, which sealingly engages the piston, a second seal member, which sealingly engages the caliper body, and a vent that is in fluid communication with the cavity. The vent includes a valve element that is operable in a sealed condition in which the valve element inhibits fluid communication between the cavity and the atmosphere. The valve element is further operable in an unsealed condition to vent at least a portion of a fluid within the cavity to the atmosphere. The valve element is normally maintained in the sealed condition but changes to the unsealed condition in response to a fluid pressure within the cavity in excess of a predetermined threshold pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a sectional view similar to that of FIG. 3 but illustrating a second brake assembly and boot-type seal constructed in accordance with the teachings of the present invention;

FIG. 6 is a sectional view taken along the line 6—6 of FIG. 5;

DETAILED DESCRIPTION OF THE PREFERRED EMBODIMENTS

Figure 1:
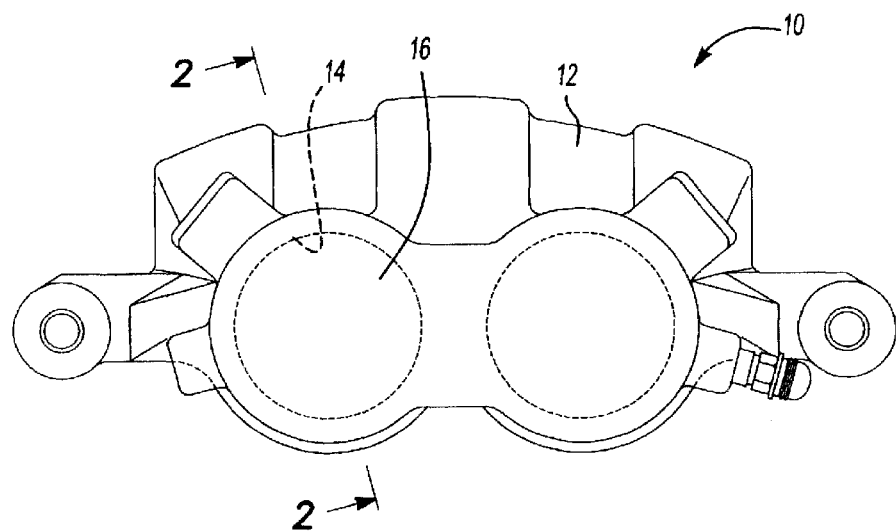
FIG. 1 is a rear elevation view of a brake assembly constructed in accordance with the teachings of the present invention.
Figure 2:
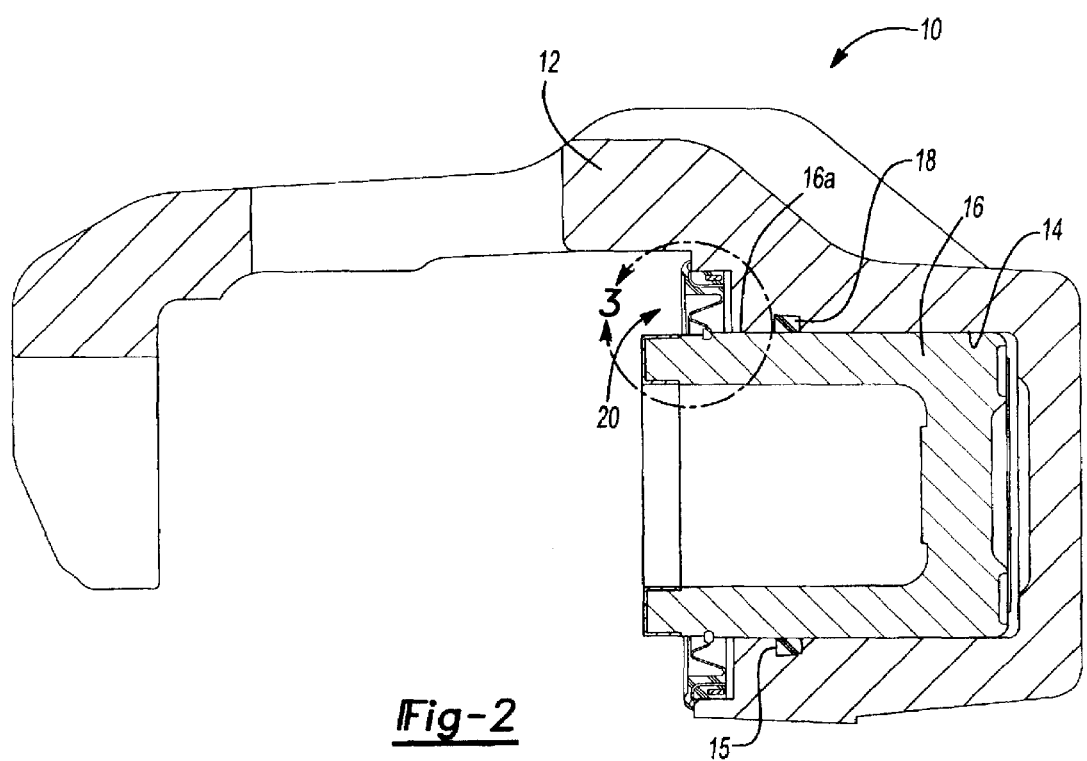
FIG. 2 is a sectional view taken along the line 2—2 of FIG. 1.

With reference to FIGS. 1 and 2 of the drawings, a brake assembly 10 is illustrated to include a caliper body 12, a caliper piston 16 and a boot-type seal 20 constructed in accordance with the teachings of the present invention. Although the brake assembly 10 is illustrated to be of a type that is commonly utilized in automotive vehicles, those skilled in the art will appreciate that the boot-type seal 20 of the present invention has other uses. Accordingly, those skilled in the art will appreciate that the example provided herein should not be interpreted as limiting the scope of the present invention in any way.

In the example provided, the caliper body 12 conventionally includes a piston bore 14, which is sized to slidingly receive the caliper piston 16, and an annular seal groove 15, which is sized to receive an annular high-pressure piston seal 18. The high-pressure piston seal 18 sealingly engages both the caliper body 12 and the caliper piston 16 in a conventional manner to inhibit a loss of a hydraulic fluid (not shown) that is employed to translate the caliper piston 16 relative to the caliper body 12.

The circumference of the caliper piston 16 is highly finished so as to effect a requisite level sealing between the caliper piston 16 and the high-pressure piston seal 18 through the range of the caliper piston's movement. Tight or close tolerancing of the piston bore 14 relative to the outer diameter of the caliper piston 16 also aids in the achievement of the requisite level of sealing.

Figure 3:
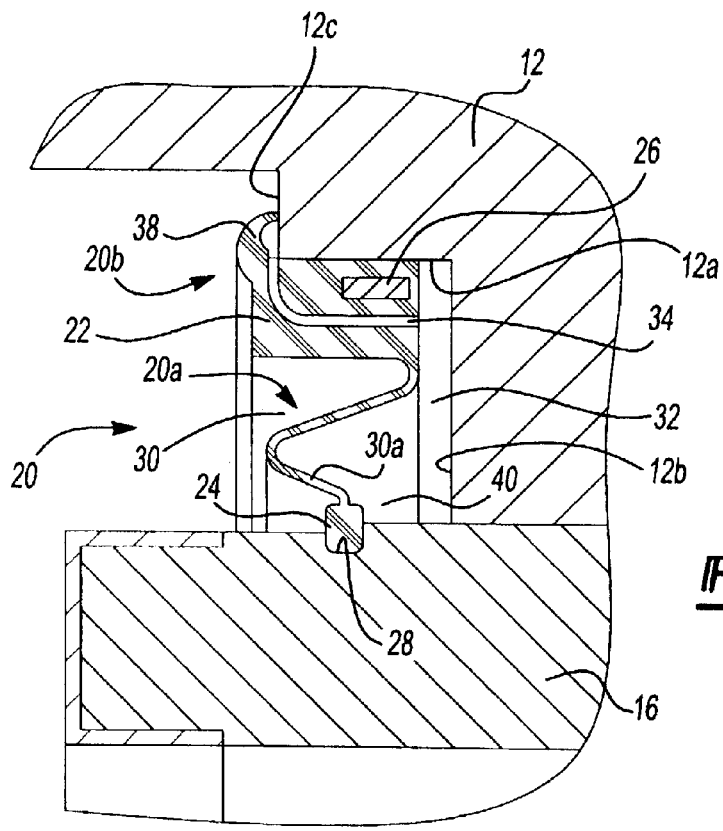
FIG. 3 is an enlarged portion of FIG. 2.

With reference to FIGS. 2 and 3, the boot-type seal 20 protects the joint that is defined by the intersection of the caliper body 12 and the caliper piston 16, as well as protects the portion of the outer surface 16a of the caliper piston 16 that is located outwardly of the high-pressure piston seal 18. The boot-type seal 20 is illustrated to include a seal portion 20a and a valve 20b, which is coupled to the seal portion 20a. The seal portion 20a includes a first seal member 22, a second seal member 24 and a bellows 30, which interconnects the first and second seal members 22 and 24. The first and second seal members 22 and 24, the bellows 30 and the valve 20b may be unitarily formed from a suitable material, such as silicone rubber.

In the example provided, the first seal member 22 abuts and sealingly engages a wall 12a of a counterbore 12b that is formed into the caliper body 12 concentric with the piston bore 14, while the second seal member 24 is disposed in and sealingly engages an annular groove 28 formed about the perimeter of the caliper piston 16. An annular reinforcing member 26, which is formed of a suitable material, such as spring steel, may be employed to reinforce the first seal member 22 and urge it into sealing contact with the caliper body 12.

The bellows 30 includes one or more convolutions 30a and as noted above, serves to interconnect the first and second seal members 22 and 24 to one another. The convolutions 30a are formed with a degree of flexibility that permits the first and second seal members 22 and 24 to remain sealingly engaged to the caliper piston 16 and the caliper body 12, respectively, throughout the caliper piston's range of movement. In this regard, the convolutions 30a deflect (e.g., fold or unfold) in response to the translation of the caliper piston 16 within the piston bore 14.

The valve 20b includes a vent channel 34, which is formed through the seal portion 20a, and a valve element 38 that is employed to seal the vent channel 34. In the example provided, the vent channel 34 is generally L-shaped, extending forwardly from a rearward surface of the first seal member 22 and thereafter radially outwardly through the perimeter of the first seal member 22. The valve element 38 is an annular lip that is resiliently coupled to the first seal member 22. The distal end of the valve element 38 engages an annular spot face 12c, which is concentric with the counterbore 12b, to thereby close the outlet of the vent channel 34.

Figure 4:
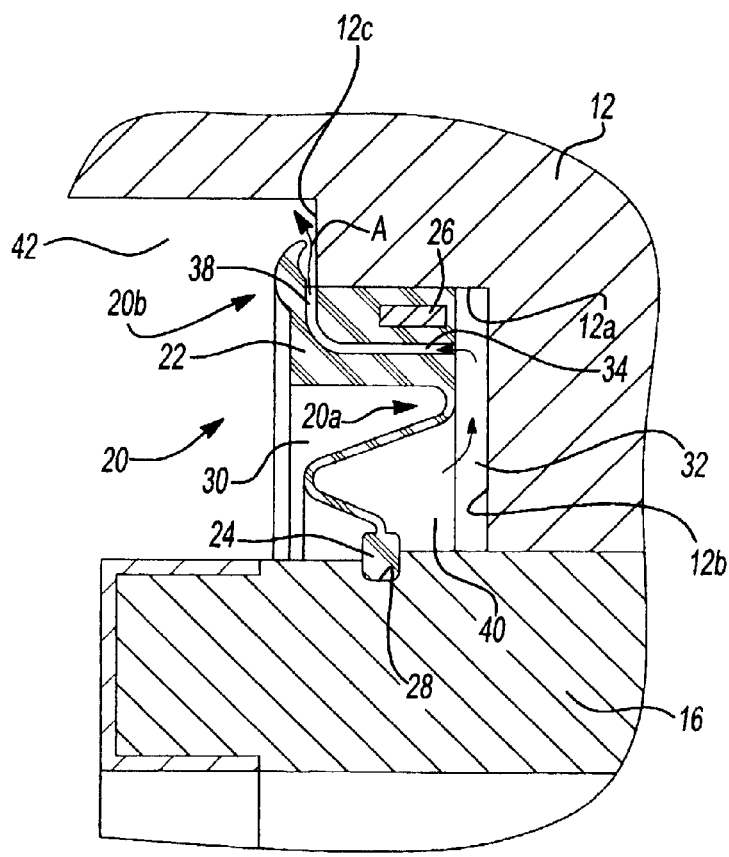
FIG. 4 is similar to FIG. 3 but illustrates the valve in an open condition to vent the seal.

With reference to FIG. 4, the pressure of the gas 40 trapped in the volume or cavity 32 that is defined by the counterbore 12b, the boot-type seal 20 and the caliper piston 16 may increase during the operation of the brake assembly 10 due to heat. Since the vent channel 34 extends through the seal portion 20a, the gas 40 exerts a force directly onto the valve element 38. When the pressure of the gas 40 increases to a predetermined threshold, the force that acts on the valve element 38 is sufficient in magnitude so as to lift the valve element 38 out of contact with the spot face 12c to enable fluid communication between the cavity 32 and the atmosphere 42. In this manner, a portion of the gas 40 that had been trapped in the cavity 32 is released through the valve 20b to the atmosphere 42 as indicated by the arrows A to thereby reduce the pressure of the gas 40 that remains in the cavity 32. With the pressure of the remaining gas 40 in the cavity 32 having been reduced through the venting operation, the force acting on the valve element 38 is reduced and as such, the valve element 38 is able to return into abutment with the spot face 12c and seal the vent channel 34.

With reference to FIGS. 5 and 6, another brake assembly 110 is illustrated and includes a caliper body 112, a caliper piston 116 and a second boot-type seal 120 that is constructed in accordance with the teachings of the present invention. The caliper body 112 and caliper piston 116 are generally similar to the caliper body 12 and caliper piston 16 of FIG. 2 and as such, will not be discussed in significant detail other than to note the manner in which they are coupled to the boot-type seal 120, which is discussed in detail, below.

The boot-type seal 120 is shown to include a seal portion 120a and a valve 120b, which is coupled to the seal portion 120a. The seal portion 120a includes a first seal member 122, a second seal member 124, a bellows 130, and an auxiliary seal member 125, which extends from the first seal member 122 and sealingly engages the caliper piston 116.

The first seal member 122 is disposed within an annular groove 127 formed in the caliper body 112 and sealingly engages the caliper body 112. The second seal member 124 is disposed within an annular groove 128 in the caliper piston 116 and sealingly engages the caliper piston 116. The bellows 130 includes a plurality of convolutions 130a and interconnects the first and second seal members 122 and 124 to one another.

The valve 120b includes a vent channel 134, which is formed through the seal portion 120a, and a valve element 138 that is employed to seal the vent channel 134. In the example provided, the vent channel 134 is generally Z-shaped, extending forwardly from a rearward surface of the second seal member 124, jogging radially inwardly and thereafter outwardly through the front of the second seal member 124. The valve element 138 is an annular lip that is resiliently coupled to the second seal member 124. The distal end of the valve element 138 engages the outer perimeter of the caliper piston 116 to thereby close the outlet of the vent channel 134.

The pressure of the gas 140 trapped in the cavity 132 that is defined by the boot-type seal 120 and the caliper piston 116 may increase during the operation of the brake assembly 110 due to heat. Since the vent channel 134 extends through the seal portion 120a, the gas 140 exerts a force directly onto the valve element 138. When the pressure of the gas 140 increases to a predetermined threshold, the force that acts on the valve element 138 is sufficient in magnitude so as to lift the valve element 138 out of contact with the caliper piston 116, which is illustrated in phantom, to enable fluid communication between the cavity 132 and the atmosphere 42. In this manner, a portion of the gas 140 that had been trapped in the cavity 132 is released through the valve 120b to the atmosphere 42 to thereby reduce the pressure of the gas 140 that remains in the cavity 132. With the pressure of the remaining gas 140 in the cavity 132 having been reduced through the venting operation, the force acting on the valve element 138 is reduced and as such, the valve element 138 is able to return into abutment with the caliper piston 116 and seal the vent channel 134.

Figure 7:
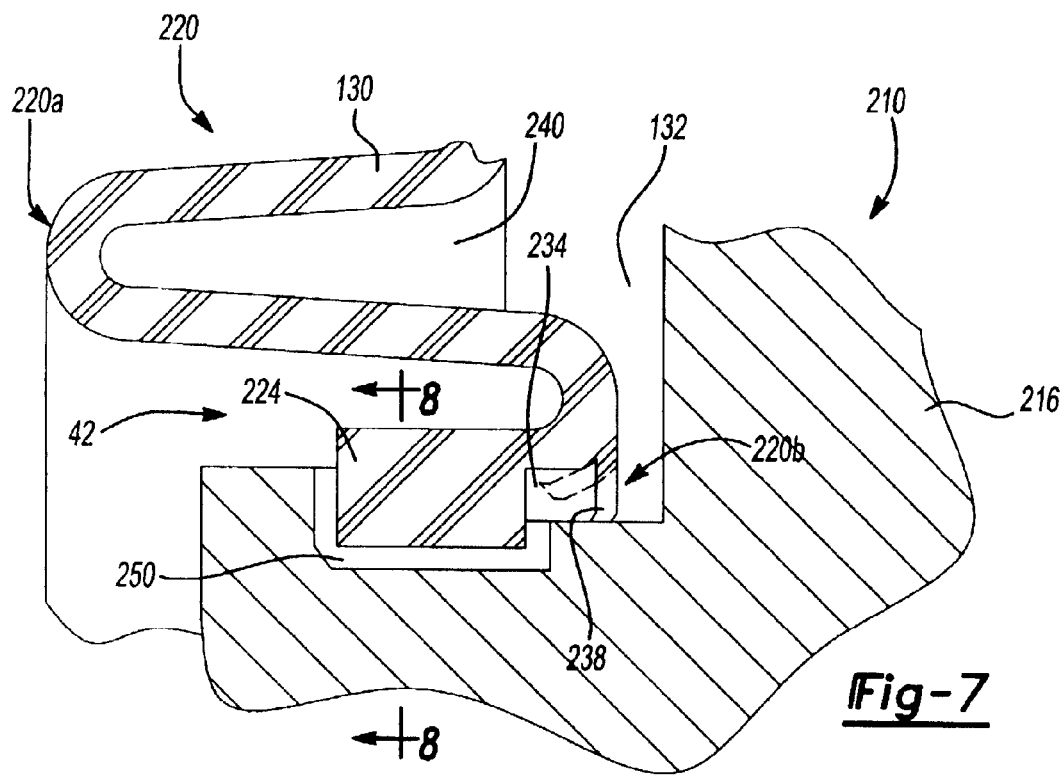
FIG. 7 is a sectional view similar to that of FIG. 3 but illustrating a third brake assembly and boot-type seal constructed in accordance with the teachings of the present invention.
Figure 8:
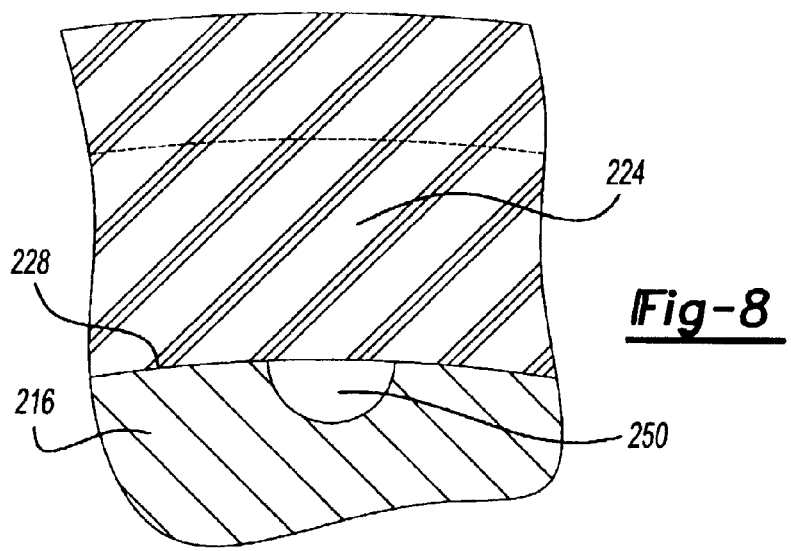
FIG. 8 is a sectional view taken along the line 8—8 of FIG. 7.

With reference to FIGS. 7 and 8, a third brake assembly 210 is illustrated. The brake assembly 210 is generally similar to the brake assembly 110 of FIGS. 5 and 6, except for the construction of the caliper piston 216 and the valve 220b of the boot-type seal 220. More specifically, the caliper piston 216 is formed with an annular groove 228 for receiving the second seal member 224, and one or more vent grooves 250, which are illustrated as being generally L-shaped in the particular example provided.

The valve 220b includes a vent channel 234, which is formed through the seal portion 220a, and a valve element 238 that is employed to seal the vent channel 234. In the example provided, the vent channel 234 extends radially outwardly from the second seal member 224 toward the caliper piston 216 and terminating at a point rearwardly of the second seal member 224. The valve element 238 is an annular lip that is resiliently coupled to the second seal member 224. The distal end of the valve element 238 engages the outer perimeter of the caliper piston 216 to thereby close the inlet of the vent channel 234.

The pressure of the gas 240 trapped in the cavity 132 that is defined by the boot-type seal 220 and the caliper piston 216 may increase during the operation of the brake assembly 210 due to heat. When the pressure of the gas 240 increases to a predetermined threshold, the force that acts on the valve element 238 is sufficient in magnitude so as to lift the valve element 238 out of contact with the caliper piston 216, which is illustrated in phantom, to enable fluid communication past the valve element 238 and into the vent channel 234. The gas exiting the cavity 132 into the vent channel 234 is able to pass through the vent grooves 250 and into the atmosphere 42. In this manner, a portion of the gas 240 that had been trapped in the cavity 132 is released through the valve 220b to the atmosphere 42 to thereby reduce the pressure of the gas 240 that remains in the cavity 132. With the pressure of the remaining gas 240 in the cavity 132 having been reduced through the venting operation, the force acting on the valve element 238 is reduced and as such, the valve element 238 is able to return into abutment with the caliper piston 216 and seal the vent channel 234.

Figure 9:
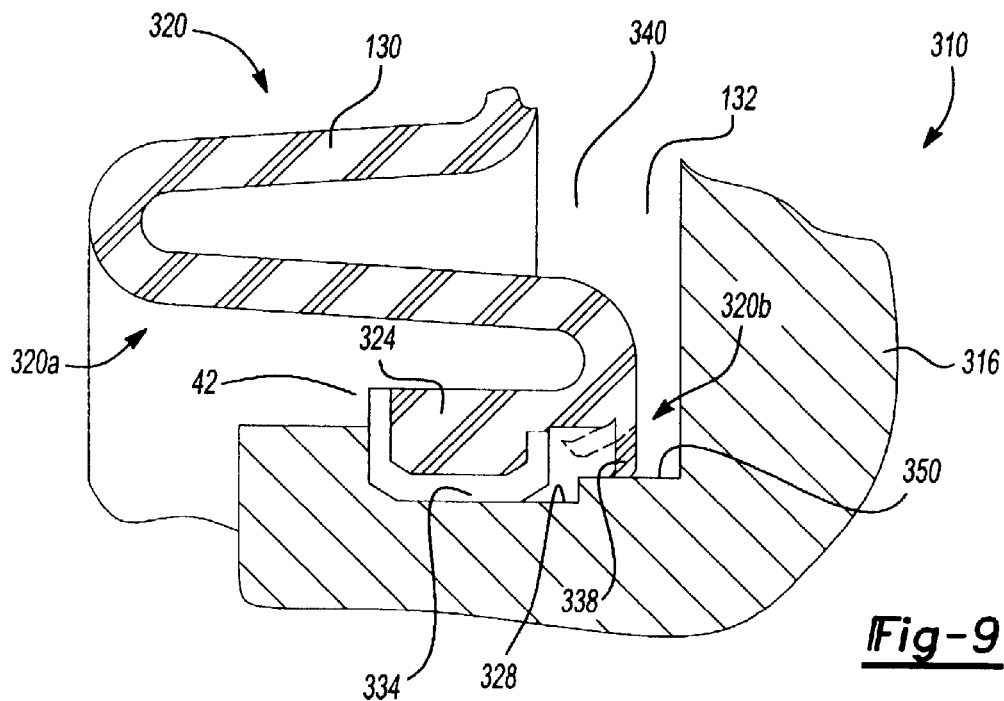
FIG. 9 is a sectional view similar to that of FIG. 3 but illustrating a fourth brake assembly and boot-type seal constructed in accordance with the teachings of the present invention.

With reference to FIG. 9, a fourth brake assembly 310 is illustrated. The brake assembly 310 is generally similar to the brake assembly 110 of FIGS. 5 and 6, except for the construction of the caliper piston 316 and the valve 320b of the boot-type seal 320. More specifically, the caliper piston 316 is formed with a first annular groove 328 for receiving the second seal member 324, and a second annular groove 350 that is positioned rearwardly of the first annular groove 328.

The valve 320b includes a vent channel 334, which is formed through the seal portion 320a, and a valve element 338 that is employed to seal the vent channel 334. In the example provided, the vent channel 334 extends radially outwardly from the second seal member 324 toward the caliper piston 216, extending forwardly therefrom through the second seal member 324 and radially inward at a point forwardly of the second seal member 324. The valve element 338 is an annular lip that is resiliently coupled to the second seal member 324. The distal end of the valve element 338 engages the outer perimeter second annular groove 350 to thereby close the inlet of the vent channel 334. Operation of the valve 320b of the boot-type seal 320 is generally similar to the operation of the valve 220b of the boot-type seal 220 discussed above, except that the gas 340 is vented to the atmosphere 42 directly through the vent channels 334.

Figure 10:
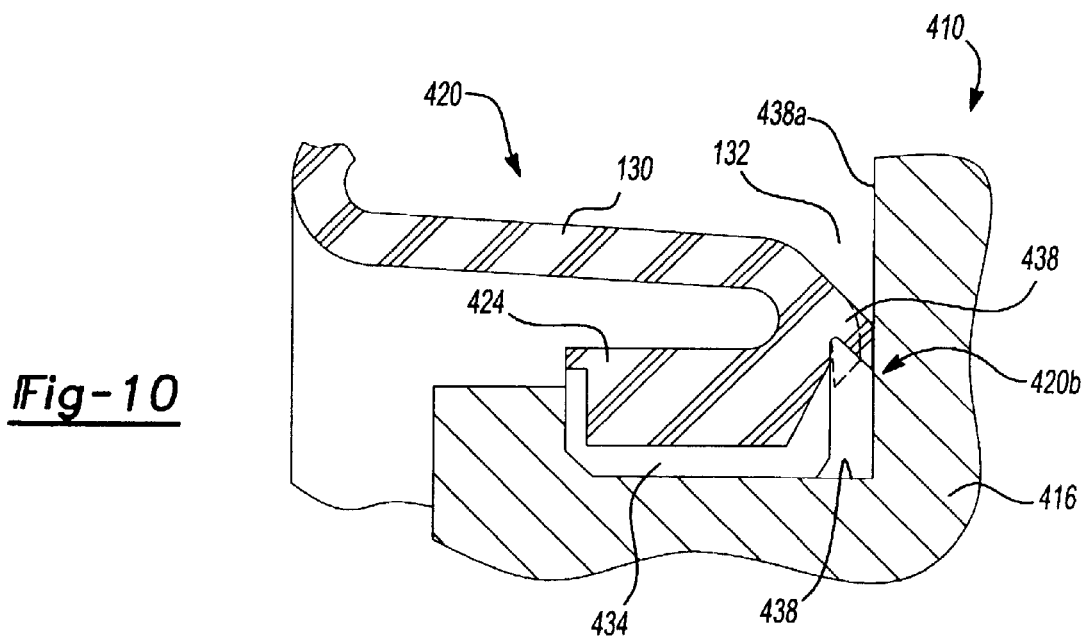
FIG. 10 is a sectional view similar to that of FIG. 3 but illustrating a fifth brake assembly and boot-type seal constructed in accordance with the teachings of the present invention.

With reference to FIG. 10, a fifth brake assembly 410 is illustrated. The brake assembly 410 is generally similar to the brake assembly 310 of FIG. 9, except for the construction of the caliper piston 416 and the valve 420b of the boot-type seal 420. More specifically, the caliper piston 416 is formed with a single annular groove 428 for receiving the second seal member 424, while the valve element 438 sealingly engages the rear face 438a of the annular groove 428 to close the inlet of the vent channel 434. Operation of the valve 420b of the boot-type seal 420 is generally similar to the operation of the valve 320b of the boot-type seal 320 discussed above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A brake assembly comprising:
   a caliper body that defines a piston bore and defining an axis;
   a caliper piston at least partially disposed in the piston bore; and
   a piston boot cooperating with the caliper body and the caliper piston to define a cavity, the piston boot including a first seal member, a second seal member and a vent, the first seal member sealingly engaging the caliper piston, the second seal member sealingly engaging the caliper body;
   said vent including a first axially extending portion and a second radially extending portion positioned in and through one of said first or second seal members from one end of the seal to the other, and the vent is in fluid communication with the cavity and includes a valve element, said valve element extending from one end of said first or second seal member and said valve element is operable in a sealed condition in which the valve element inhibits fluid communication between the cavity and the atmosphere, the valve element being further operable in an unsealed condition to vent at least a portion of a fluid within the cavity to the atmosphere, the valve element being normally maintained in the sealed condition but changing to the unsealed condition in response to a fluid pressure within the cavity in excess of a predetermined threshold pressure.

2. The brake assembly of claim 1, wherein the piston boot includes a bellows that interconnects the first and second seal members.

3. The brake assembly of claim 1, wherein the seal and the vent are unitarily formed.

4. The brake assembly of claim 1, wherein the first seal member includes a radial reinforcing member.

5. The brake assembly of claim 1, wherein the valve is integrally formed with one of the first and second seal members.

6. The brake assembly of claim 5, wherein the valve includes a channel formed through the one of the first and second seal members.

7. The brake assembly of claim 6, wherein the valve includes a movable lip element that closes off the channel when the valve is in the sealed condition.

8. The brake assembly of claim 1, wherein the caliper piston includes a groove for receiving the second seal lip.

* * * * *